No. 667,310. Patented Feb. 5, 1901.
S. GEORGE.
ROLLER BOXING.
(Application filed June 29, 1898. Renewed July 31, 1900.)
(No Model.)
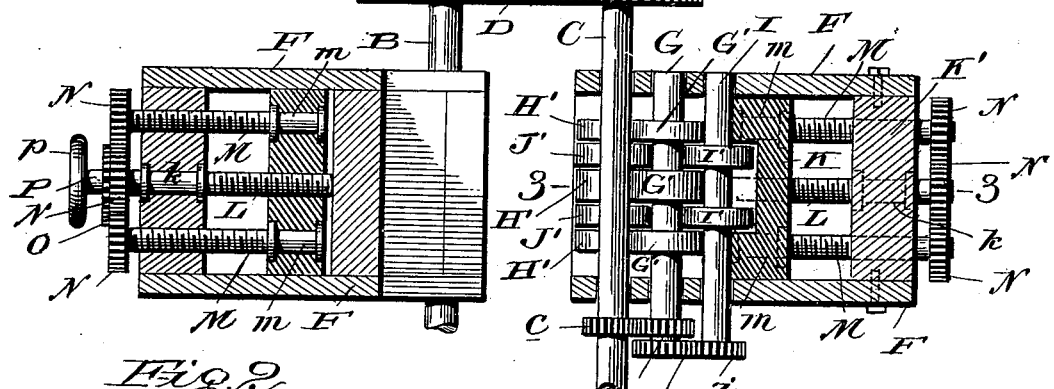
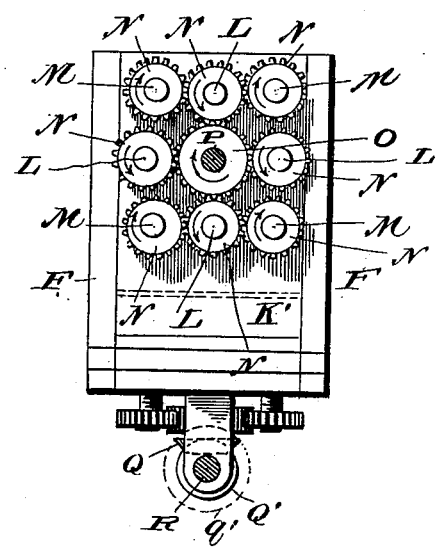
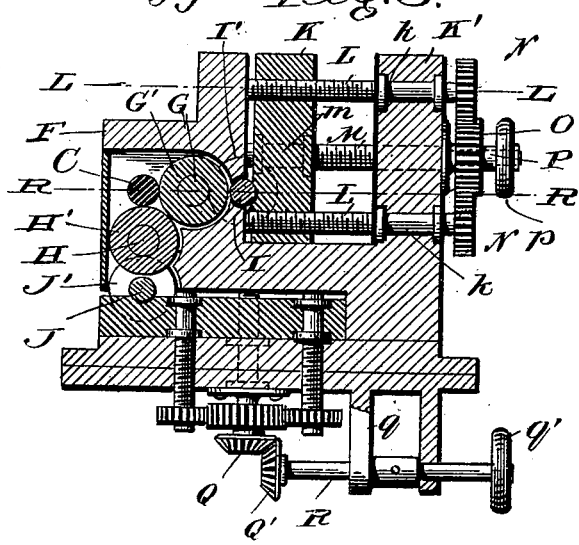
Witnesses
L. C. Hills
Henry Hills.
Inventor:
Seymour George,
By E. H. Bond
Attorney

UNITED STATES PATENT OFFICE.

SEYMOUR GEORGE, OF PITTSBURG, PENNSYLVANIA, ASSIGNOR OF ONE-HALF TO CHARLES FRANCIS HARRIS, OF SAME PLACE.

ROLLER-BOXING.

SPECIFICATION forming part of Letters Patent No. 667,310, dated February 5, 1901.

Application filed June 29, 1898. Renewed July 31, 1900. Serial No. 25,455. (No model.)

*To all whom it may concern:*

Be it known that I, SEYMOUR GEORGE, a citizen of the United States, residing at Pittsburg, in the county of Allegheny and State of Pennsylvania, have invented certain new and useful Improvements in Roller-Boxings; and I do hereby declare the following to be a full, clear, and exact description of the invention, such as will enable others skilled in the art to which it appertains to make and use the same.

This invention relates to certain new and useful improvements in mechanical devices for use in connection with a shaft or shafts to prevent as much as possible wear in the bearings, and thus avoid lost motion.

The roller boxing or bearing hereinafter described is adapted for use in connection with a shaft or shafts of any and all kinds of engines, pumps, or other machinery; but I have chosen to show my improvement in this instance as applied to two parallel shafts of a rotary engine without, however, restricting myself to its use in such relation.

In the preferable form of my invention (that herein illustrated) I hang two rollers on parallel shafts in one box, said roller-shafts being on parallel lines with the main shaft and the center lines of said roller-shafts being on horizontal lines with the center line of the main shaft, and that side of the main shaft next to the first roller rests tightly against the same, the object being to prevent spreading of the main shaft to the right or left, as the case may be, and thus overcome friction in that direction, and another set of rollers and shafts similar to the ones just mentioned are hung in the same boxing, but placed underneath or below the main shaft, the latter resting on the first roller. Thus the main shaft is supported vertically by the first roller hung in the said boxing below the main shaft. The shafts of the rollers are made, preferably, of the same diameter as the main shaft, and the periphery of each of the first rollers rests against the periphery of the main shaft, and the periphery of the shaft of the first roller rests against the periphery of the second roller, each roller being substantially twice the diameter of the main shaft and of its own shaft. Hence the main shaft will make four revolutions or turns to one of the second roller. Thus the friction from velocity or side pressure will be four times less on the shaft of the second roller than that of the main shaft. Thus if the main shaft makes, say, five hundred revolutions a minute the second roller will turn one hundred and twenty-five times, and as the main shaft will roll, not slide, on the two first rollers all friction from rubbing or sliding will be removed from the main shaft, and in like manner as the first roller-shafts roll on the second rollers the same result follows on these shafts. Hence the friction on the main shaft is transmitted to a third shaft—that is, the second roller-shaft and its boxings—which third shaft, as before described, revolves one-fourth as many times per minute as the main shaft. Therefore all wear horizontally from side pressure or spreading of the main shaft and also all wear vertically from the weight of the main shaft will be transferred to the third shaft, and therefore all lost motion from wear on the bearings and in the boxings of the third or second roller-shaft can be readily taken up at will, and thus prevent the main shaft from getting out of line with its casing. The means employed for taking up the lost motion comprises a series of screws passing through a tail-block, part of the screws having the said tail-block for their nut and the others having the boxing-cap for their nut, the one set being hung on swivels or pivots in the tail-block and the other set likewise connected with the cap of the boxing. The inner ends of the screws hung in the tail-block rest solidly against the face of the boxing of the second roller, the screws being geared together by gears on their ends outside the tail-block, with an additional or driving gear geared into four of the gears of the screws, by turning which all of the screws turn simultaneously, one set moving the cap of the second roller-boxing backward or forward and the other set turning at the same time in the opposite direction to permit the cap to move one way or the other. The one set of screws whose inner ends rest against the face of the boxing provide the base against which to tighten up the boxing-cap against the shaft, and the other set of screws afford the means for tightening the same, while by turning the driving-gear the lost motion in the second roller-boxing can be taken up instantly, and thus by means of this adjustment and the adjustable boxing the main shafts—say in a rotary motor having two parallel shafts—may be kept in perfect line with their casings, and so prevent all wear in the internal mechanism of the motor, so that when made steam-tight they ever will remain so, provided the boxing on the second roller-shaft is kept neatly adjusted. Hence no packing will be required. In fact, packing would cause wear. Hence packing is only shifting instead of removing an evil.

The screws of the boxing beneath the main shaft may be actuated in any suitable way—in this instance shown as operated through the medium of bevel-gears, as being the most practicable; but it will be understood that other means may be provided for this purpose.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a view, partly in top plan and partly in section, showing the application of my invention to the shafts of a rotary motor or engine, the section on the right being taken on the line R R of Fig. 3 and the section on the left being taken on the line L L of said Fig. 3. Fig. 2 is an end elevation with the shaft of the driving-gear and also the shaft of the operating means for the lower bearing shown in section. Fig. 3 is a vertical section on the line 3 3 of Fig. 1.

Like letters of reference indicate like parts throughout the several views.

It will be understood from reference to Fig. 1 that two sets of boxings or bearings are provided in connection with a motor having two parallel shafts, one for each shaft; but as the construction and operation of the two are identical a description of the one will suffice.

Referring then to the details of the drawings by letter, A designates a portion of the cylinder or casing of a rotary motor, which may be, say, like that described and shown in my application filed March 5, 1896, Serial No. 581,977, or any other style.

B and C are the parallel shafts of the motor, and D and E the gears on said shafts, intermeshing, as shown, to insure perfect uniform rotation.

F is the boxing or housing, in the side walls of which, as seen in Fig. 1 at the right, are the passages for the main shaft C and between which side walls are arranged the rollers and the tail-block, which will now be described in detail.

G is the first roller-shaft. It is supported in the side walls of the boxing, as seen best in Fig. 1, in horizontal line with the main shaft C, while H represents the first vertical roller-shaft, likewise supported in the side walls of the boxing in vertical line with the main shaft C, as seen best in Fig. 3. On the shaft G are the rollers G', more or less in number, as may be found most expedient. These rollers revolve in contact with the main shaft, as indicated in Figs. 1 and 3, while upon the shaft H are the rollers H', which also revolve in contact with the said main shaft, as indicated best in Fig. 3.

I is the second roller-shaft, mounted in horizontal line with the shafts C and G, as shown in Figs. 1 and 3, and upon this shaft are the rollers I', the said rollers being so proportioned with relation to the size of the shafts that the rollers G' revolve in contact with the shaft C and the rollers I' revolve in contact with the shaft G, as seen in Fig. 1 and as indicated by dotted lines in Fig. 3, the rollers on the two shafts being disposed, as shown, so that the rollers on the one shaft will be disposed between the rollers on the other shaft, as will be readily understood.

J is the second vertical shaft, supported in the boxing in vertical line with the shafts C and H, as seen best in Fig. 3, and upon this shaft are the rollers J', the disposition of the rollers on the vertical shafts being the same as that of those on the horizontal shafts, so that the rollers on the first shaft revolve in contact with the main shaft and with the second shaft, and the rollers on the latter shaft revolve in contact with the shaft of the first rollers, as indicated in Fig. 3.

The shafts of these rollers are geared together and with the main shaft, so that the said rollers will be positively revolved under all circumstances. In Fig. 1 at the right I have shown these shafts as so geared, the letter $c$ designating the gear on the main shaft C, which meshes with a gear $g$ on the shaft G, and on this latter shaft is another gear $g'$, which meshes with the gear $i$ on the shaft I, the gear $c$ also being designed to impart motion to the two vertical shafts H and J in like manner. The gears of the latter shafts are not illustrated; but it is believed that their disposition, being similar to those on the horizontal shafts, will be readily understood.

The means for taking up the lost motion in the second roller-shaft will now be described. As the means employed for the horizontal and vertical shafts is the same, except as to the means for actuating the driving-gear thereof, a description of the one only is necessary for a full and clear understanding of the same. Referring, then, to the various views, K designates the end plate or cap to the boxing, and K' the tail-block. In the present instance I have shown eight screws as being employed in this connection; but it is evident that this number may be varied, made either more or less, as may be found most expedient, without materially affecting the result, and I therefore do not intend to restrict myself to the number of the screws employed. These screws are in sets of four each, one set being so arranged as to have their nut in the tail-block and the other four having their nut in the cap to the boxing. In Fig. 2 is seen in end elevation all eight of the screws and their gears, which latter will be more particularly hereinafter referred to. By the gearing shown four of these screws are made to turn simultaneously in one direction, and the other four at the same time move simultaneously in the opposite direction. The direction of movement of the various screws is indicated by the arrows in Fig. 2. The four screws L are pivoted or swiveled in the tail-block K', as seen at k, while their ends are threaded into the cap K, as seen best in Fig. 3, and bear against the wall of the housing, as seen in said Fig. 3, while the other four screws M are swiveled or pivoted in the cap K, as seen at m, and have their outer ends threaded into the tail-block K'. On the outer end of each screw is a gear N, as seen best in Fig. 2, the three gears at the top meshing with each other and the three gears at the bottom meshing with each other, as seen clearly in said Fig. 2. The intermediate gears on the horizontal shafts in horizontal line with the central gear do not mesh with each other nor with the top and bottom gears; but these gears mesh with the driving-gear O, which is fast upon a stub-shaft P, which is supported upon the outer face of the tail-block or fixed part of the housing, as shown, and this driving-gear meshes with the central gears at the top and bottom and the two sides, as indicated in Fig. 2. This central or driving gear is somewhat wider than the other gears, as indicated best in Fig. 3, so that it may be at all times in mesh with the other gears regardless of the adjustment of the cap to the boxing, as will be readily understood. It will be understood that the gear O is revolubly mounted on its shaft and should be provided with some means whereby it can be turned to adjust the screws. I have shown it in this instance as provided with a knob or hand-wheel p.

The screws and gears for the vertical bearing or boxing are the same in construction and operation as those just described in connection with the horizontal bearing or boxing, and further description thereof therefore seems unnecessary. For convenience of operation, however, the shaft carrying the driving-gear is provided with a bevel-gear Q, which meshes with a bevel-gear Q' on a horizontal shaft R, supported in a suitable bearing q, as seen in Figs. 2 and 3, and is extended and provided with a suitable device, as a handwheel q', by means of which the driving-gear and the screws may be operated. It is evident, however, that where there is sufficient space the driving-gear of the screws of the vertical boxing may be operated the same as that of the horizontal bearing, or any other desired means may be substituted for that herein shown.

The operation will be apparent, and the advantages will be readily appreciated. The bearing of the main shaft is entirely upon the rollers, and consequently there is no rubbing of the shaft. When it becomes necessary to take up the lost motion or to compensate for wear, which, however, will be very seldom, all that it is necessary to do is to turn the wheel p or the wheel q', as the case may be, and as this is done motion is imparted to the driving-gear, which in turn imparts motion simultaneously to all of the screws, and as the latter are turned the one set of four will revolve in one direction and the other set in the opposite; but the two sets being oppositely arranged, as described, the cap will be moved in the one direction or the other according to the direction of movement given the driving-gear, and by reason of the disposition of the various screws, as shown, the cap must be kept in perfect alinement with the shaft of the second roller, as will be clearly understood, and hence the same can be kept properly adjusted and the main shaft kept in proper alinement, the vertical and horizontal boxings compensating for vertical and horizontal pressure.

The size of the rollers and their shafts may be varied as circumstances may require, and other modifications in the details of construction may be resorted to without departing from the spirit of the invention or sacrificing any of its advantages.

Having thus described my invention, what I claim as new, and desire to secure by Letters Patent, is—

1. A double roller-boxing for a shaft, the same comprising rollers for vertical and horizontal pressure geared together and to said shaft and means for independently adjusting the same, as set forth.

2. An adjustable double roller-boxing for shafting and gearing connecting its shafts, substantially as specified.

3. The combination with a main shaft, of horizontal shafts carrying rollers, with the rollers of the intermediate shaft revolving in contact with said main shaft and with the shaft of the adjacent rollers and gearing by which all of said shafts are geared together, substantially as specified.

4. The combination with a shaft, of shafts in line therewith and carrying rollers with the rollers on one shaft engaging the shaft of the other rollers, and means for adjusting the bearing of the last shaft of the series and gearing directly gearing all of said shafts together, as shown and described.

5. The combination with a shaft, of shafts in vertical and horizontal line therewith and provided with rollers, the rollers of the shafts adjacent the main shaft revolving in contact therewith and the rollers of the other shafts revolving in contact with the shafts of the next adjacent rollers, substantially as specified.

6. The combination with a shaft, of shafts in vertical and horizontal line therewith and provided with rollers, the rollers of the shafts adjacent the main shaft revolving in contact therewith and the rollers of the other shafts revolving in contact with the shafts of the next adjacent rollers, and means for adjustment of the bearing of the last of the series of rollers, as and for the purpose specified.

7. A roller-bearing comprising shafts parallel with each other and carrying rollers with the rollers of the one shaft mounted to revolve in contact with the shaft next adjacent, gearing connecting all of said shafts and means for adjusting the bearing of the last shaft of the series to take up lost motion, substantially as specified.

8. The combination with a shaft, of shafts parallel therewith and geared thereto and to each other, and rollers on said shafts with the peripheries of the rollers on one shaft revolving in contact with the next adjacent shaft, substantially as specified.

9. The combination with a shaft, of shafts parallel therewith and geared to move in unison therewith, rollers on said shafts with the rollers on the shaft next adjacent to the main shaft revolving in contact therewith and the rollers on the next shaft revolving in contact with its adjacent shaft, and means for taking up the lost motion of the last-mentioned shaft, substantially as specified.

10. The combination of two parallel shafts, with roller-boxings for said shafts one set disposed in vertical alinement with one of said shafts and the other in horizontal alinement with the other shaft having means for preventing spreading of said shafts and for compensating for wear from vertical and horizontal pressure, substantially as specified.

11. The combination with the shafts and their rollers arranged as described, of an adjustable cap and a series of screws a portion of which are threaded into said cap and the others swiveled therein for moving the said cap all mounted to be moved in unison, as and for the purpose set forth.

12. The combination with the shafts and their rollers arranged as described, of a movable cap for the last shaft of the series, a series of screws for moving said cap and gears on said screws and a driving-gear meshing therewith whereby all the screws are moved in unison, as set forth.

13. The combination with the shafts and their rollers arranged as described, of a movable cap, a series of screws for moving the said cap, part of the said screws being threaded in the cap and a part being threaded in a fixed part of the housing, and means whereby all of the screws are moved simultaneously, the one set in one direction and the other set in the opposite direction, substantially as and for the purpose specified.

14. The combination of a plurality of shafts, rollers on the shafts, and a movable cap, with two sets of screws the one set being threaded in the cap and swiveled in a fixed part of the housing, and the other set being threaded in the fixed part of the housing and swiveled in the cap, and means for actuating all of said screws simultaneously, as and for the purpose specified.

15. The combination with the movable cap and the screws for actuating the same, of gears on the outer ends of the screws, with the gears of the three upper screws meshing with each other and the gears of the three lowermost screws meshing with each other, a driving-gear meshing with the central gears only of the said screws, whereby one set of screws will be turned in one direction and the other set in the opposite direction, and means for actuating the driving-gear, substantially as specified.

16. The combination with a movable cap, of screws for moving the same and means for operating the screws, part in one direction and part simultaneously in the opposite direction, substantially as specified.

17. The combination with two parallel shafts, of compound roller-boxings for said shafts, said boxings having one set of rollers revolving in contact with said shafts, and another set of rollers revolving in contact with the shafts of the first set of rollers and forming the bearings thereof, whereby friction is transferred from the main shafts to the shafts of the last-mentioned rollers, and adjusting devices for said last-mentioned shafts whereby lost motion from wear of the bearings may be taken up and spreading of the shafts prevented, as set forth.

18. The combination with two parallel shafts, of compound roller-boxings for said shafts, said boxings having one set of rollers revolving in contact with said main shafts on horizontal alinement and another set revolving in contact with the main shafts in vertical alinement and forming the bearings of said main shafts, and another set of rollers in horizontal alinement and another set in vertical alinement, each of said rollers revolving in contact with the shafts of the first rollers and forming their bearings, the said first rollers revolving at a lower rate of speed than the main shafts and the second rollers revolving at a lower rate of speed than the first rollers, the shafts of the rollers being geared together and with the main shafts to insure positive rotation thereof, and adjusting devices for the shafts of the outer rollers of the series for taking up the lost motion from wear of the bearings of the outer shafts resulting from side pressure horizontally or the sinking of the same vertically, thereby avoiding leakage of steam, substantially as described.

19. The combination with the housing, and the movable cap, of shafts carrying rollers, the tail-block, screws swiveled in the tail-block and threaded through the cap and bearing at their inner ends against the housing, other screws threaded in the tail-block and swiveled in the cap, and gearing for simultaneously turning said screws, substantially as and for the purpose specified.

In testimony whereof I affix my signature in presence of two witnesses.

SEYMOUR GEORGE.

Witnesses:
WM. L. FORD,
E. H. BOND.